(12) United States Patent
Hogan et al.

(10) Patent No.: US 8,383,698 B2
(45) Date of Patent: Feb. 26, 2013

(54) ESTERS OF CYCLOHEXANE POLYCARBOXYLIC ACIDS AS PLASTICIZERS IN RUBBER COMPOUNDS

(75) Inventors: Terrence E. Hogan, Akron, OH (US); William J. Corsaut, Uniontown, OH (US)

(73) Assignee: Bridgestone Corporation, Tokyo (JP)

( * ) Notice: Subject to any disclaimer, the term of this patent is extended or adjusted under 35 U.S.C. 154(b) by 223 days.

(21) Appl. No.: 12/556,767

(22) Filed: Sep. 10, 2009

(65) Prior Publication Data

US 2010/0063178 A1 Mar. 11, 2010

Related U.S. Application Data

(60) Provisional application No. 61/095,799, filed on Sep. 10, 2008.

(51) Int. Cl.
*C08J 5/14* (2006.01)

(52) U.S. Cl. ............ 523/157; 152/525; 152/510; 524/1; 524/284

(58) Field of Classification Search .................... 523/157
See application file for complete search history.

(56) References Cited

U.S. PATENT DOCUMENTS

| | | | |
|---|---|---|---|
| 7,297,738 B2 | 11/2007 | Gosse et al. | |
| 7,337,913 B2 | 3/2008 | Breitscheidel et al. | |
| 7,868,073 B2 | 1/2011 | Kameda | |
| 2003/0119965 A1* | 6/2003 | Galimberti et al. | 524/492 |
| 2003/0234067 A1* | 12/2003 | Kataoka et al. | 152/525 |
| 2005/0043473 A1 | 2/2005 | Centner et al. | |
| 2005/0085583 A1 | 4/2005 | Hong | |
| 2006/0178446 A1 | 8/2006 | Bedat et al. | |
| 2007/0037926 A1 | 2/2007 | Olsen et al. | |
| 2008/0039646 A1 | 2/2008 | Storzum et al. | |
| 2010/0204358 A1 | 8/2010 | Lopitaux | |
| 2010/0256275 A1 | 10/2010 | Lopitaux | |

FOREIGN PATENT DOCUMENTS

| | | |
|---|---|---|
| EP | 1393759 | 3/2004 |
| EP | 1566401 | 8/2005 |
| EP | 1393759 | 10/2005 |
| JP | 7011074 | 1/1995 |
| JP | 7173342 | 7/1995 |
| JP | 3401888 | 2/2003 |
| JP | 3456226 | 8/2003 |
| JP | 2006-63102 | 3/2006 |

OTHER PUBLICATIONS

ICIS Publications, Innovation Awards 2006, pp. 1-7, Oct. 16-22, 2006.*

* cited by examiner

*Primary Examiner* — Doris Lee
(74) *Attorney, Agent, or Firm* — Meredith E. Hooker; Nathan T. Lewis

(57) ABSTRACT

It has been discovered that the use of a plasticizer, an ester of a cyclohexanepolycarboxylic acid, especially a 1,2-cyclohexanedicarboxylic acid ester, that is environmentally non-toxic, can replace environmentally unfriendly phthalate plasticizers, such as dioctyl phthalates used in vulcanizable rubber compositions, especially for tires, on a one to one weight basis (phr) without sacrificing beneficial rubber properties.

12 Claims, No Drawings

ESTERS OF CYCLOHEXANE POLYCARBOXYLIC ACIDS AS PLASTICIZERS IN RUBBER COMPOUNDS

This application claims the benefit of priority from U.S. Provisional Application Ser. No. 61/095,799 filed Sep. 10, 2008, the entire disclosure of which is hereby incorporated by reference.

BACKGROUND OF THE INVENTION

Diesters of phthalic acid, particularly dioctyl phthalates (DOP) and the like, are widely used as plasticizers for the processing of many PVC soft plastics, and in the rubber, paint and emulsifier industries, where it can improve the rebound elasticity of products and reduce permanent distortions. In tire treads, in particular, phthalate diester plasticizers can improve snow traction performance. However, due to concerns over the toxicological effects of phthalates, environmental and health groups are now pushing to restrict the use of phthalates, especially in products with direct human contact, such as cosmetics, toys, medical devices and the like.

Although the rubber industry has not yet been directly involved in such environmental concerns, it has been considered prudent by this company to investigate substitutions for phthalate Jesters, such as DOP and the like, in rubber compositions. Several substitute compounds have been investigated; however, a one-to-one quantitative substitution of any of these compounds for DOP, that provided the same beneficial rubber properties as DOP, has not been found previously.

Recently, it has been discovered that certain esters of cyclohexanepolycarboxylic acids are environmentally non-toxic and can be used as plasticizers for polyvinyl chloride to enable products with comparable mechanical properties to be obtained using less polyvinyl chloride. Further, esters and other derivatives of cyclohexanepolycarboxylic acids have been shown to be useful as components of paints, varnish, inks, adhesives, sealants and the like; as components in lubricating oil or cutting oil, especially in metal working; and as plasticizers in the production of semi-rigid to highly flexible materials, such as medical materials, particularly blood bags, tubing and the like, and cling film for food applications, and the like.

However, the use of such cyclohexanepolycarboxylic acid esters as plasticizers in rubber compounds has not been reported. Nor have the effects of such chemicals on rubber properties been reported. In view of our previously unsuccessful search for non-toxic plasticizers that could be used in quantitative amounts similar to DOP and produce equivalent desirable rubber properties, expectations were not high that cyclohexanepolycarboxylic acid esters would be a suitable substitute for diesters of phthalates, such as DOP and the like, in rubber compounds.

SUMMARY OF THE INVENTION

Unexpectedly, it has been found that non-phthalate plasticizers, such as certain cyclohexanepolycarboxylic acid esters and, particularly, 1,2-cyclohexanedicarboxylic acid esters and the like, are useful as plasticizers in rubber compounds. Further, such 1,2-cyclohexanedicarboxylic acid esters can be used quantitatively as a one-to-one replacement for diesters of phthalic acid and they provide equivalent rubber properties to those provided by the phthalic acid diesters, including desirable wet traction and snow traction, while maintaining other advantageous physical properties of the rubbers. Therefore, esters of cyclohexanepolycarboxylic acids, especially 1,2-cyclohexanedicarboxylic acid esters, are acceptable and desirable environmentally non-toxic replacements for phthalic acid diesters in rubber compounds and tire components made from them, especially tire treads.

In particular, the invention is concerned with a vulcanizable rubber composition comprising an elastomer; a reinforcing filler comprising a selection from the group consisting of silica, carbon black, and mixtures thereof; a plasticizer comprising a 1,2-cyclohexanedicarboxylic acid ester; and a cure agent. When the reinforcing filler comprises silica, the composition further comprises a selection from the group consisting of a silica coupling agent, a silica shielding agent, and mixtures thereof, as described below.

The 1,2-cyclohexanedicarboxylic acid ester plasticizer is present in the composition as a replacement for a phthalic acid ester plasticizer such as, but not limited to, dioctyl phthalate and the like, often used in rubber compositions. Therefore, the invention composition is substantially free of a plasticizer comprising a phthalic acid ester and, in a very suitable arrangement, the 1,2-cyclohexanedicarboxylic acid ester is present in the composition in an amount sufficient to substantially replace an equivalent amount by weight of a phthalic acid ester plasticizer that could be otherwise used in the composition. As a non-limiting example, the 1,2-diisononyl-cyclohexanedicarboxylic acid ester can be employed on a weight basis per hundred parts rubber (phr) substantially as a one-to-one replacement for the phthalic acid ester plasticizer, dioctyl phthalate. The 1,2-cyclohexanedicarboxylic acid ester can be present in the composition, for example, in an amount of about 0.01 to about 100 phr.

The elastomer in the vulcanizable rubber composition can be selected from the group consisting of homopolymers of a conjugated diene monomer, and copolymers and terpolymers of the conjugated diene monomers with monovinyl aromatic monomers and trienes and, in at least one arrangement of the invention, can be sulfur vulcanizable.

The invention also provides a pneumatic tire including at least one component comprising a vulcanized rubber compound made from the vulcanizable rubber composition. In a very suitable arrangement, the at least one component of the tire comprises a tire tread.

DETAILED DESCRIPTION OF THE INVENTION

The terms elastomer, polymer and rubber are used interchangeably herein, as is customary in the rubber industry.

It has been discovered unexpectedly that certain cyclohexanepolycarboxylic acid esters, such as 1,2-cyclohexanedicarboxylic acid esters and the like, are useful as environmentally non-toxic plasticizers in rubber compounds and can be substituted for esters of phthalates, such as dioctyl phthalate, on substantially a one-to-one weight basis per hundred parts rubber in rubber compositions, while maintaining essentially the same desirable rubber properties.

In one arrangement, the invention comprises a vulcanizable rubber composition comprising an elastomer; a reinforcing filler comprising a selection from the group consisting of silica, carbon black, and mixtures thereof; a plasticizer comprising a 1,2-cyclohexane-dicarboxylic acid ester; and a cure agent. The 1,2-cyclohexane-dicarboxylic acid ester can be, but is not intended to be limited to, a 1,2-diisobutyl-cyclohexanedicarboxylic acid ester; a 1,2-di-(2-ethylhexyl)-cyclohexane-dicarboxylic acid ester; a 1,2-diisononylcyclohexane-dicarboxylic acid ester; a 1,2-di-$C_9$-cyclohexane-dicarboxylic acid ester; a 1,2-diisopentylcyclohexanedicarboxylic acid; a 1,2-diisoheptyl-cyclohexanedicarboxylic acid; a 1,2-diisodecylcyclohexanedicarboxylic acid; a 1,2-di-$C_{7-11}$-cyclohexanedicarboxylic acid; a 1,2-di-$C_{9-11}$-cyclohexanedicarboxylic acid; a 1,2-di-$C_{7-9}$-cyclohexanedicarboxylic acid; and mixtures thereof. In a particularly suitable arrangement, the 1,2-cyclohexane-dicarboxylic acid ester comprises a 1,2-diisononylcyclohexanedicarboxylic acid ester.

The 1,2-cyclohexanedicarboxylic acid ester can be present in the vulcanizable rubber composition in an amount of about 0.01 to about 100 phr, suitably about 1 to about 40 phr, more suitably about 5 to about 20 phr and, especially, about 5 to about 15 phr. The 1,2-cyclohexanedicarboxylic acid ester can also be used as an oil extender for one or more elastomers employed in the composition. In this arrangement, the 1,2-cyclohexanedicarboxylic acid ester can be used as an oil extender for the elastomer in the amount of about one to about 40 parts, typically about 5 to about 40, of the total weight of the oil extended elastomer and this amount would be included in the total amount of the 1,2-cyclohexanedicarboxylic acid ester in the rubber composition.

The vulcanizable rubber composition is intended to be free of environmentally toxic plasticizers and, therefore, is substantially free of a plasticizer comprising a phthalic acid ester, such as dioctyl phthalate and the like, that is often used as a plasticizer in such rubber compositions. The 1,2-cyclohexanedicarboxylic acid ester is present in the composition in an amount sufficient to substantially replace an equivalent amount by weight of a phthalic acid ester plasticizer, as a simple one-to-one replacement by weight (parts per hundred of rubber, phr).

When the reinforcing filler comprises silica, the vulcanizable rubber composition according to the invention further comprises a selection from the group consisting of a silica coupling agent, a silica shielding agent, and mixtures thereof. Such silica coupling agents and/or shielding agents are well known in the art of rubber compounding and are described further below.

In another arrangement, the invention also provides a pneumatic tire including at least one component comprising a vulcanized rubber compound made from a vulcanizable rubber composition that comprises an elastomer; a reinforcing filler comprising a selection from the group consisting of silica, carbon black, and mixtures thereof; a plasticizer comprising 1,2-cyclohexanedicarboxylic acid ester; and a cure agent. The 1,2-cyclohexanedicarboxylic acid ester can comprise any of those listed above. In a very suitable arrangement, the 1,2-cyclohexanedicarboxylic acid ester can comprise, but is not limited to, 1,2-diisononylcyclohexanedicarboxylic acid. Although the vulcanized rubber compound is used especially in tire treads, the compound can be used to make other components of tires, as described below.

The vulcanizable rubber compositions according to the invention can comprise any solution polymerizable or emulsion polymerizable elastomer. Solution and emulsion polymerization techniques are well known to those of ordinary skill in the art. For example, conjugated diene monomers, monovinyl aromatic monomers, triene monomers, and the like, can be anionically polymerized to form conjugated diene polymers, or copolymers or terpolymers of conjugated diene monomers and monovinyl aromatic monomers (e.g., styrene, alpha methyl styrene and the like) and triene monomers. The elastomers that are typically employed within vulcanizable compositions that are useful for making tires and tire components include both natural and synthetic elastomers. For example, these elastomers include, without limitation, natural rubber, synthetic polyisoprene rubber, styrene/butadiene rubber (SBR), polybutadiene, butyl rubber, neoprene, ethylene/propylene rubber, ethylene/propylene diene rubber (EPDM), acrylonitrile/butadiene rubber (NBR), silicone rubber, fluoroelastomers, ethylene acrylic rubber, ethylene vinyl acetate copolymers (EVA) epichlorohydrin rubbers, chlorinated polyethylene rubber, chlorosulfonated polyethylene rubbers, hydrogenated nitrile rubber, tetrafluoroethylene/propylene rubber and the like. Preferred polymers for use in the vulcanizable rubber compositions of the invention include polyisoprene, polybutadiene, butadiene/isoprene copolymer, butadiene/isoprene/styrene terpolymer, isoprene/styrene copolymer, and styrene/butadiene copolymer. As used herein, the term elastomer or rubber will refer to a blend of synthetic and natural rubber, a blend of various synthetic rubbers, or simply one type of elastomer or rubber. When the preferred polymers are blended with conventional rubbers, the amounts can vary widely within a range comprising from about one to about 100 percent by weight of the total rubber, with the conventional rubber or rubbers making up the balance of the total rubber (100 parts).

The elastomers that are useful in practicing this invention include any of the various functionalized polymers that are conventionally employed in the art of making tires. For example, polymers can be terminally functionalized, or functionalized throughout the polymer backbone, such as with functional groups derived from an anionic polymerization initiator or a terminating or coupling agent. Preparation of functionalized polymers is well known to those skilled in the art. Exemplary methods and agents for functionalization of polymers are disclosed, for example, in U.S. Pat. Nos. 5,268, 439, 5,496,940, 5,521,309 and 5,066,729, the disclosures of which are hereby incorporated by reference. For example, compounds that provide terminal functionality that are reactive with the polymer bound carbon-lithium moiety can be selected to provide a desired functional group. Examples of such compounds are alcohols, substituted aldimines, substituted ketimines, Michler's ketone, 1,3-dimethyl-2-imidazolidinone, 1-alkyl substituted pyrrolidinones, 1-aryl substituted pyrrolidonones, tin tetrachloride, tributyl tin chloride, carbon dioxide, and mixtures thereof. Other useful terminating agents can include those of the structural formula $(R)_a ZX_b$, where Z is tin or silicon, R is an alkyl having from about one to about 20 carbon atoms, a cycloalkyl having from about 3 to about 30 carbon atoms; and aryl having from about 6 to about 20 carbon atoms, or an aralkyl having from about 7 to about 20 carbon atoms. For example, R can include methyl, ethyl, n-butyl, neophyl, phenyl, cyclohexyl, or the like. X is a halogen, such as chlorine or bromine, or alkoxy (—OR), "a" is an integer from zero to 3, and "b" is an integer from one to 4, where a+b=4. Examples of such terminating agents include tin tetrachloride, tributyl tin chloride, butyl tin trichloride, butyl silicon trichloride, as well as tetraethoxysilane, $Si(OEt)_4$, and methyl triphenoxysilane, $MeSi(OPh)_3$. The practice of the present invention is not limited solely to polymers terminated with these agents, since other compounds that are reactive with the polymer bound carbon-lithium moiety can be selected to provide a desired functional group.

The vulcanizable rubber compositions of the invention are preferably compounded with reinforcing fillers, such as silica or carbon black, or a mixture of silica and carbon black. Examples of suitable silica reinforcing filler include, but are not limited to, precipitated amorphous silica, wet silica (hydrated silicic acid), dry silica (anhydrous silicic acid), fumed silica, calcium silicate, and the like. Other suitable fillers include aluminum silicate, magnesium silicate, and the like. Among these, precipitated amorphous wet-process, hydrated silicas are preferred. These silicas are so-called because they are produced by a chemical reaction in water, from which they are precipitated as ultrafine, spherical particles. These primary particles strongly associate into aggregates, which in turn combine less strongly into agglomerates. The surface area, as measured by the BET method gives the best measure of the reinforcing character of different silicas. For silicas of interest for the present invention, the surface area should be about 32 $m^2/g$ to about 400 $m^2/g$, with the range of about 100 $m^2/g$ to about 250 $m^2/g$ being preferred, and the range of about 150 $m^2/g$ to about 220 $m^2/g$ being most preferred. The pH of the silica filler is generally about 5.5 to about 7 or slightly over, preferably about 5.5 to about 6.8.

Silica can be employed in the amount of about one to about 150 parts by weight per hundred parts of the elastomer (phr), preferably in an amount of about five to about 80 phr and, more preferably, in an amount of about 30 to about 80 phr. The useful upper range is limited by the high viscosity imparted by fillers of this type. Some of the commercially available silicas which can be used include, but are not limited to, Hi-Sil® 190, Hi-Sil® 210, Hi-Sil® 215, Hi-Sil® 233, Hi-Sil® 243, and the like, produced by PPG Industries (Pittsburgh, Pa.). A number of useful commercial grades of different silicas are also available from Degussa Corporation (e.g., VN2, VN3), Rhone Poulenc (e.g., Zeosil® 1165 MP), and J. M. Huber Corporation.

The elastomers can be compounded with all forms of carbon black in a mixture with the silica. The carbon black can be present in amounts ranging from about one to about 90 phr, with about five to about 60 phr being preferred. The carbon blacks can include any of the commonly available, commercially-produced carbon blacks, but those having a surface area (EMSA) of at least 20 $m^2/g$ and, more preferably, at least 35 $m^2/g$ up to 200 $m^2/g$ or higher are preferred. Surface area values used in this application are determined by ASTM D-1765 using the cetyltrimethyl-ammonium bromide (CTAB) technique. Among the useful carbon blacks are furnace black, channel blacks and lamp blacks. More specifically, examples of useful carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which can be utilized include acetylene blacks. A mixture of two or more of the above blacks can be used in preparing the carbon black products of the invention. Typical suitable carbon blacks are N-110, N-220, N-339, N-330, N-351, N-550 and N-660, as designated by ASTM D-1765-82a. The carbon blacks utilized in the preparation of the vulcanizable elastomeric compositions of the invention can be in pelletized form or an unpelletized flocculent mass. Preferably, for more uniform mixing, unpelletized carbon black is preferred.

The vulcanizable rubber compositions of the invention can optionally further include a silica coupling agent such as, but not limited to, a mercaptosilane, a blocked mercaptosilane, a bis(trialkoxysilylorgano)polysulfide, a 3-thiocyanatopropyl trimethoxysilane, silanes that are carried on a filler such as silica, carbon black and the like, or any of the silica coupling agents that are known to those of ordinary skill in the rubber compounding art. Exemplary mercaptosilanes include, but are not limited to, 1-mercapto-methyltriethoxysilane, 2-mercaptoethyltriethoxysilane, 3-mercaptopropyltriethoxysilane, 3-mercaptopropylmethyldiethoxysilane, 2-mercaptoethyltriproxysilane, 18-mercaptooctadecyl-diethoxychlorosilane, and the like. The mercaptosilane can be present in the compound in an amount of about 0.0001% to about 3% by weight, typically about 0.001% to about 1.5% by weight, and especially about 0.01% to about 1% by weight, based on the weight of the silica. Exemplary blocked mercaptosilanes include, but are not limited to, octanoyl blocked mercaptans and the like. Exemplary bis(trialkoxysilylorgano)polysulfide silica coupling agents include, but are not limited to, bis(3-triethoxysilyl-propyl)tetrasulfide (TESPT), which is sold commercially under the tradename Si69 by Degussa Inc., New York, N.Y., and bis(3-triethoxysilylpropyl)disulfide (TESPD) or Si75, available from Degussa, or Silquest® A1589, available from Crompton. The polysulfide organosilane silica coupling agent can be present in an amount of about 0.01% to about 20% by weight, based on the weight of the silica, preferably about 0.1% to about 15% by weight, and especially about 1% to about 10%.

Exemplary silica shielding agents suitable for use in the invention include, but are not limited to an alkyl alkoxysilane, an alkoxy-modified silsesquioxane (AMS) a mercaptan/alkoxy-modified co-AMS, an amino AMS, an amino/mercaptan co-AMS, a fatty acid ester of a hydrogenated or non-hydrogenated $C_5$ or $C_6$ sugar, a polyoxyethylene derivative of a fatty acid ester of a hydrogenated or non-hydrogenated $C_5$ or $C_6$ sugar, and mixtures thereof or a mineral or non-mineral additional filler, as described in greater detail below. Exemplary fatty acid esters of hydrogenated and non-hydrogenated $C_5$ and $C_6$ sugars (e.g., sorbose, mannose, and arabinose) that are useful as silica dispersing aids include, but are not limited to, the sorbitan oleates, such as sorbitan monooleate, dioleate, trioleate and sesquioleate, as well as sorbitan esters of laurate, palmitate and stearate fatty acids. Fatty acid esters of hydrogenated and non-hydrogenated $C_5$ and $C_6$ sugars are commercially available from ICI Specialty Chemicals (Wilmington, Del.) under the trade name SPAN®. Representative products include SPAN® 60 (sorbitan stearate), SPAN® 80 (sorbitan oleate), and SPAN® 85 (sorbitan trioleate). Other commercially available fatty acid esters of sorbitan are also available, such as the sorbitan monooleates known as Alkamul® SMO; Capmul® O; Glycomul® O; Arlacel® 80; Emsorb® 2500; and S-Maz® 80. A useful amount of these additional silica dispersing aids when used with the bis(trialkoxysilylorgano) polysulfide silica coupling agents is about 0.1% to about 25% by weight based on the weight of the silica, with about 0.5% to about 20% by weight being preferred, and about 1% to about 15% by weight based on the weight of the silica being more preferred. In the alkyl alkoxysilane and mercaptosilane embodiment of the invention, it may be desirable to use about 0.1% to about 20% by weight of the fatty acid ester based on the weight of the silica. Esters of polyols, including glycols such as polyhydroxy compounds and the like, in the same quantities, are also useful in all invention embodiments.

Exemplary polyoxyethylene derivatives of fatty acid esters of hydrogenated and non-hydrogenated $C_5$ and $C_6$ sugars include, but are not limited to, polysorbates and polyoxyethylene sorbitan esters, which are analogous to the fatty acid esters of hydrogenated and non-hydrogenated sugars noted above except that ethylene oxide groups are placed on each of the hydroxyl groups. Representative examples of polyoxyethylene derivatives of sorbitan include POE® (20) sorbitan monooleate, Polysorbate® 80, Tween® 80, Emsorb® 6900, Liposorb® O-20, T-Maz® 80, and the like. The Tween® products are commercially available from ICI Specialty Chemicals. Generally, a useful amount of these optional silica dispersing aids is about 0.1% to about 25% by weight based on the weight of the silica, with about 0.5% to about 20% by weight being preferred, and about 1% to about 15% by weight based on the weight of the silica being more preferred.

The silica coupling agents, silica shielding agents and/or other silica dispersing aids and/or other liquid components of the composition can be fully or partially supported by the reinforcing filler. The ratio of the component to the reinforcing filler is not critical. If the dispersing aid is a liquid, a suitable ratio of dispersing aid to filler is that which results in a suitably dry material for addition to the elastomer. For example, the ratio can be about 1/99 to about 70/30, about 20/80 about 60/40, about 50/50, and the like.

Certain additional fillers can be utilized according to the present invention as processing aids, including mineral fillers, such as clay (hydrous aluminum silicate), talc (hydrous magnesium silicate), aluminum hydrate [Al(OH)$_3$] and mica, as well as non-mineral fillers such as urea and sodium sulfate. Preferred micas principally contain alumina and silica, although other known variants are also useful. The foregoing additional fillers are optional and can be utilized in the amount of about 0.5 to about 40 phr, preferably in an amount of about one to about 20 phr and, more preferably in an amount of about one to about 10 phr. These additional fillers can also be used as non-reinforcing fillers to support the strong organic base catalysts, as well as any of the silica dispersing aids, and silica coupling agents described above. As with the support of the silica dispersing aid on the reinforcing filler, as described above, the ratio of dispersing aid to non-reinforcing filler is not critical. For example, the ratio can be about 1/99 to about 70/30, about 20/80, about 60/40, about 50/50, and the like, by weight.

The vulcanizable rubber compositions are compounded or blended by using mixing equipment and procedures conventionally employed in the art, such as mixing the various vulcanizable polymer(s) with reinforcing fillers and commonly used additive materials such as, but not limited to, curing agents, activators, retarders and accelerators; processing additives, such as oils; resins, including tackifying resins; plasticizers; pigments; additional fillers; fatty acid; zinc oxide; waxes; antioxidants; antiozonants; peptizing agents; and the like. As known to those skilled in the art, the additives mentioned above are selected and commonly used in conventional amounts.

Preferably, an initial master batch is prepared that includes the rubber component and the reinforcing fillers, as well as other optional non-curative additives, such as processing oil, antioxidants, and the like. After the master batch is prepared, one or more optional remill stages can follow in which either no ingredients are added to the first mixture, or the remainder of the non-curing ingredients are added, in order to reduce the compound viscosity and improve the dispersion of the reinforcing filler. The final step of the mixing process is the addition of vulcanizing agents to the mixture.

According to the embodiments of this invention, the 1,2-cyclohexanedicarboxylic acid ester can be added during preparation of the master batch and/or during subsequent stages, and/or the final stage, and still provide the desired processability of the compound, as well as the favorable mechanical, dynamic viscoelastic and tensile properties of the final rubber compound.

The vulcanizable composition can then be processed according to ordinary tire manufacturing techniques. Likewise, the tires are ultimately fabricated by using standard rubber curing techniques. For further explanation of rubber compounding and the additives conventionally employed, one can refer to The Compounding and Vulcanization of Rubber, by Stevens in Rubber Technology, Second Edition (1973 Van Nostrand Reibold Company), which is incorporated herein by reference. The reinforced rubber compounds can be cured in a conventional manner with known vulcanizing agents at about 0.1 to 10 phr. For a general disclosure of suitable vulcanizing agents, one can refer to Kirk-Othmer, Encyclopedia of Chemical Technology, 3rd ed., Wiley Interscience, N.Y. 1982, Vol. 20, pp. 365 to 468, particularly Vulcanization Agents and Auxiliary Materials, pp. 390 to 402, or Vulcanization by A. Y. Coran, Encyclopedia of Polymer Science and Engineering, Second Edition (1989 John Wiley & Sons, Inc.), both of which are incorporated herein by reference. Vulcanizing agents can be used alone or in combination. Preferably, the rubber compounds are sulfur-vulcanized. Cured or crosslinked polymers will be referred to as vulcanizates for purposes of this disclosure.

The vulcanizable rubber compositions of the present invention can be utilized to form treadstocks for tires. Pneumatic tires can be made according to the constructions disclosed in U.S. Pat. Nos. 5,866,171; 5,876,527; 5,931,211; and 5,971,046, the disclosures of which are incorporated herein by reference. The composition can also be used to form other elastomeric tire components such as subtreads, black sidewalls, body ply skims, bead fillers and the like.

EXAMPLES

The following examples illustrate a comparison of the physical properties of rubber compounds containing a 1,2-cyclohexanedicarboxylic acid, diisononyl ester plasticizer (Hexamoll™ DINCH from BASF, abbreviated to Hexamoll™ in each of the examples), with the physical properties of rubber compounds containing dioctylphthalate (DOP) and tire components containing them. The examples include a carbon black formulation and two formulations containing both silica and carbon black. However, the examples are not intended to be limiting, as other rubber compounds, including different compounding formulations and different cyclohexanepolycarboxylic acid esters can be employed, as determined by those skilled in the art without departing from the scope of the invention herein disclosed and claimed.

Example 1

Compounding of Carbon Black-filled Rubber

The plasticizer, Hexamoll™ was used in comparison with dioctylphthalate (DOP) in the otherwise identical rubber compositions shown in Table 1. Each of the rubber compounds was prepared in two stages, namely an initial masterbatch, and a final stage. The initial stage was mixed in a 65 g Banbury mixer operating at 60 RPM and 130° C. First, the elastomer was placed in the mixer and, after 30 seconds, the remaining ingredients except stearic acid were added. At 2.5 minutes, stearic acid was added. From 4.5 minutes, the rotor speed was increased to 90 RPM and the ingredients were mixed for 6 minutes. At the end of this mixing, the mixing temperature was approximately 147° C. to 156° C. The samples were transferred to a mill operating at a temperature of 60° C., where they were sheeted and subsequently cooled to room temperature.

The final stage was mixed by adding the material from the initial stage and the curative materials to the mixer simultaneously. The initial mixer temperature was 60° C. and it was operating at 40 RPM. The final material was removed from the mixer after 3 minutes when the material temperature was between 90° C. and 95° C. The formulations were then prepared into test specimens and cured within a closed cavity mold under pressure for 15 minutes at 171° C. The test specimens were then subjected to various physical tests, and the results of these tests are reported in Tables 2-4.

Example 2

Processing Evaluation of Carbon Black-filled Rubber

1. The Green Stock Mooney Viscosity and Curing Characteristics

The processing of the green stocks (i.e., the stock obtained after the final stage, prior to curing) was characterized as to Mooney viscosity and cure characteristics. In particular, the stock 2 containing Hexamoll™ was evaluated and compared with the stock 1 containing DOP by examining the compound Mooney viscosity and scorch characteristics. The Mooney viscosity measurement was conducted at 130° C. using a large rotor. The Mooney viscosity was recorded as the torque when the rotor was rotated for 4 minutes. The samples were preheated at 130° C. for one minute before the rotor was started. A Monsanto Rheometer MD2000 was used to characterize the stock curing process. The frequency was 1.67 Hz and the strain was 7% at 160° C. The T90 obtained from these measurements represents the time when the torque rose to 90% of the total torque increase during the curing process. This measurement was used to predict the curing rate during the curing process. The results of the compound Mooney ($ML_{1+4}$) and curing characteristics are shown in Table 2 and illustrate that the Hexamoll™-containing stock 2 had results that were comparable to those obtained with the DOP-containing stock 1.

TABLE 1

| | Stock No. | |
|---|---|---|
| | DOP Stock 1 (phr) | Hexamoll ™ Stock 2 (phr) |
| Masterbatch | | |
| Solution SBR, tin coupled* | 100 | 100 |
| Carbon Black | 50 | 50 |
| Dioctylphthalate | 10 | 0 |
| Hexamoll ™ | 0 | 10 |
| Wax | 2 | 2 |
| Antioxidant** | 1 | 1 |
| Stearic Acid | 2.0 | 2.0 |
| Oil*** | 10 | 10 |
| Final | | |
| Zinc Oxide | 2.5 | 2.5 |
| Sulfur | 1.5 | 1.5 |
| Diphenyl guanidine | 1.3 | 1.3 |
| N-tert-butyl-2-benzothiazolesulfenamide | 0.5 | 0.5 |
| 2,2'dithiobis(benzothiazole) | 0.5 | 0.5 |

*SBR = 20% styrene, 55% vinyl, $ML_4$ = 72
**Santoflex ® 6PPD
***Hyprene BO300

TABLE 2

| | Stock No. | |
|---|---|---|
| | DOP Control Stock 1 | Hexamoll ™ Stock 2 |
| $ML_{1+4}$ @ 130° C. | 33.0 | 32.8 |
| MH-ML (kg-cm) | 12.64 | 12.48 |
| T90 (min) | 7.50 | 8.04 |

2. Dynamic Viscoelastic Mechanical Properties

The dynamic viscoelastic mechanical properties were obtained from temperature sweep tests conducted with a frequency of 31.4 rad/sec using 0.2% strain for temperatures ranging from −100° C. to −10° C. and 2% strain for temperatures ranging from −10° C. to 100° C. The 50° C. tan δ data were also obtained from strain sweep measurements at a strain level of 5%. A frequency of 31.4 rad/sec was used for the strain sweep which was conducted at 60° C. with strain sweeping from 0.25% to 14.75%. The degree of filler flocculation after compounding (the Payne effect, ΔG') was estimated by subtracting the storage modulus G' at 14.25% strain from the G' at 0.25% strain. The value of tan δ at 0° C. can be used to predict the tire wet traction, and the value of the tan δ at 60° C. can be used to predict the rolling resistance properties of the tires. The G' at −30° C. is a predictor of tire ice and snow traction.

Other viscoelastic properties were measured by using the dynamic compression test. The sample geometry used for dynamic compression test was a cylindrical button 9.5 mm in diameter and 15.6 mm in length. The sample was compressed under a static load of 2 kg before testing. After it reached an equilibrium state, the test began with a dynamic compression load of 1.25 Kg at a frequency of 1 Hz. The sample was then dynamically compressed and then extended and the resultant displacement and hysteresis (tan δ) were recorded. The viscoelastic properties are shown in Table 3 for the two rubber stocks.

TABLE 3

| | Stock No. | |
|---|---|---|
| | DOP Stock 1 | Hexamoll ™ Stock 2 |
| G', −30° C., 0.2% strain, MPa | 767 | 761 |
| tan δ, 0° C., 10 Hz, 0.2% strain | 0.535 | 0.518 |
| Dynastat tan δ, 0° C. | 0.549 | 0.576 |
| tan δ, 60° C., 10 Hz, 2% strain | 0.137 | 0.147 |
| ΔG', 60° C., 10 Hz, MPa | 0.731 | 0.732 |
| tan δ, 60° C., 5% strain | 0.131 | 0.136 |
| Dynastat tan δ, 60° C. | 0.126 | 0.123 |

3. Tensile Mechanical Properties

The tensile mechanical properties were measured using the standard procedure described in ASTM-D 412 at 25° C. Test specimens are microdumbell samples. The symbols M50, M200 and M300 correspond to modulus at 50%, 200% and 300% elongation respectively. The symbols $T_b$ and $E_b$ refer to the tensile at break and percent elongation at break. Toughness is a measure of the area under the stress-strain curve. The tensile properties for the two stocks are shown in Table 4.

TABLE 4

| | Stock No. | |
|---|---|---|
| | DOP Stock 1 | Hexamoll ™ Stock 2 |
| Dumbell Tensile @ 25° C. | | |
| M50 (MPa) | 1.17 | 1.14 |
| M300 (MPa) | 12.0 | 12.2 |
| $T_b$ (MPa) | 12.8 | 18.0 |
| $E_b$ % | 314 | 396 |
| Toughness (MPa) | 15.9 | 29.1 |
| Dumbell Tensile @ 100° C. | | |
| M50 (MPa) | 1.07 | 1.05 |
| M300 (MPa) | 5.74 | 5.72 |
| $T_b$ (MPa) | 6.80 | 6.50 |
| $E_b$ % | 222 | 217 |
| Toughness (MPa) | 6.35 | 5.89 |

As illustrated by the data in Tables 2 to 4, the physical properties of the carbon black compounded rubbers are essentially the same, whether DOP or Hexamoll™ is used as the plasticizer.

Example 3

Compounding of Carbon Black and Silica Filled Rubber

The plasticizer, Hexamoll™ was used in comparison with dioctylphthalate (DOP) in the otherwise identical rubber compositions shown in Table 5. Each of the rubber compounds was prepared in three stages, namely an initial masterbatch, second masterbatch and a final stage. The initial stage was mixed in a 300 g Banbury mixer operating at 50 RPM and 90° C. First, the elastomer was placed in the mixer and, after 30 seconds, the remaining ingredients except stearic acid were added. At 2.5 minutes, stearic acid was added. From 4.5 minutes, the rotor speed was increased to 90 RPM and the ingredients were mixed for 6 minutes. At the end of this mixing, the mixing temperature was approximately 147° C. to 156° C. The samples were transferred to a mill operating at a temperature of 60° C., where they were sheeted and subsequently cooled to room temperature.

The second masterbatch stage was mixed by adding the material from the initial stage and the curative materials to the mixer simultaneously. The initial mixer temperature was 100° C. and it was operating at 50 RPM. The final material was removed from the mixer after 3 minutes when the material temperature was between 140° C. and 150° C. The samples were transferred to a mill operating at a temperature of 60° C., where they were sheeted and subsequently cooled to room temperature.

The final stage was mixed by adding the material from the initial stage and the curative materials to the mixer simultaneously. The initial mixer temperature was 60° C. and it was operating at 40 RPM. The final material was removed from the mixer after 3 minutes when the material temperature was between 100° C. and 110° C. The formulations were then prepared into test specimens and cured within a closed cavity mold under pressure for 15 minutes at 171° C. The test specimens were then subjected to various physical tests, and the results of these tests are reported in Tables 6 through 8.

TABLE 5

| | Stock No. | |
|---|---|---|
| | DOP Stock 3 (phr) | Hexamoll™ Stock 4 (phr) |
| Masterbatch | | |
| Solution SBR, tin coupled* | 100 | 100 |
| Carbon Black | 27 | 27 |
| Silica | 24.5 | 24.5 |
| Dioctylphthalate | 5 | 0 |
| Hexamoll™ | 0 | 5 |
| Wax | 2 | 2 |
| Antioxidant** | 0.95 | 0.95 |
| Stearic Acid | 2.0 | 2.0 |
| Oil*** | 10 | 10 |
| Second Masterbatch | | |
| Silica | 2.5 | 2.5 |
| S2 Silane† | 2.5 | 2.5 |
| Final | | |
| Zinc Oxide | 2.5 | 2.5 |
| Sulfur | 1.5 | 1.5 |
| Diphenyl guanidine | 0.7 | 0.7 |

TABLE 5-continued

| | Stock No. | |
|---|---|---|
| | DOP Stock 3 (phr) | Hexamoll™ Stock 4 (phr) |
| N-tert-butyl-2-benzothiazolesulfenamide | 0.6 | 0.6 |
| 2,2'dithiobis(benzothiazole) | 0.5 | 0.5 |

*SBR = 20% styrene, 55% vinyl, $ML_4$ = 72
**Santoflex ® 6PPD
***Hyprene BO300
†bis(3-triethoxysilylpropyl) disulfide

Example 4

Processing Evaluation of Carbon Black and Silica Filled Rubber

The green stock Mooney viscosity and curing characteristics, and the dynamic viscoelastic mechanical properties and tensile mechanical properties of the cured stocks were measured as described in Example 2. In particular, the stock 4 containing Hexamoll™ was evaluated and compared with the stock 3 containing DOP. The results are illustrated in Tables 6, 7 and 8, respectively.

TABLE 6

| | Stock No. | |
|---|---|---|
| | DOP Control Stock 3 | Hexamoll™ Stock 4 |
| $ML_{1+4}$ @ 130° C. | 42.2 | 43.7 |
| MH-ML (kg-cm) | 17.85 | 17.75 |
| T90 (min) | 11.7 | 11.8 |

TABLE 7

| | Stock No. | |
|---|---|---|
| | DOP Stock 3 | Hexamoll™ Stock 4 |
| G', −30° C., 0.2% strain, MPa | 1001 | 1000 |
| tan δ, 0° C., 10 Hz, 0.2% strain | 0.530 | 0.533 |
| tan δ, 60° C., 10 Hz, 2% strain | 0.138 | 0.136 |
| ΔG', 60° C., 10 Hz, MPa | 1.18 | 1.11 |
| tan δ, 60° C., 5% strain | 0.124 | 0.121 |
| Dynastat tan δ, 60° C. | 0.114 | 0.113 |

TABLE 8

| | Stock No. | |
|---|---|---|
| | DOP Stock 3 | Hexamoll™ Stock 4 |
| Dumbell Tensile @ 25° C. | | |
| M50 (MPa) | 1.52 | 1.56 |
| M300 (MPa) | 10.8 | 10.4 |
| $T_b$ (MPa) | 20.1 | 18.7 |
| $E_b$ % | 488 | 473 |
| Toughness (MPa) | 43.7 | 39.4 |
| Dumbell Tensile @ 100° C. | | |
| M50 (MPa) | 1.52 | 1.43 |
| M200 (MPa) | 6.3 | 6.0 |
| $T_b$ (MPa) | 9.1 | 9.0 |
| $E_b$ % | 272 | 282 |
| Toughness (MPa) | 11.6 | 11.9 |

As illustrated by the data in Tables 6 through 8, the physical properties of the carbon black and silica compounded rubbers are essentially the same, whether DOP or Hexamoll™ is used as the plasticizer.

Therefore, it has been demonstrated that environmentally non-toxic cyclohexanepolycarboxylic acid esters, particularly 1,2-cyclohexanedicarboxylic acid esters and the like, are useful as plasticizers in rubber compounds. Further, such 1,2-cyclohexanedicarboxylic acid esters provide equivalent rubber properties to those provided by the phthalic acid diesters, including desirable wet traction and snow traction, while maintaining other advantageous physical properties of the rubbers.

While the invention has been described herein with reference to the preferred embodiments, it is to be understood that it is not intended to limit the invention to the specific forms disclosed. On the contrary, it is intended that the invention cover all modifications and alternative forms falling within the scope of the appended claims.

We claim:

1. A vulcanizable rubber composition comprising:
   (a) an elastomer;
   (b) a reinforcing filler comprising a selection from the group consisting of silica, carbon black, and mixtures thereof;
   (c) a plasticizer comprising a 1,2-cyclohexanedicarboxylic acid ester, wherein 1,2-cyclohexane-dicarboxylic acid ester is present in the composition in an amount sufficient to substantially replace an equivalent amount by weight of a phthalic acid ester plasticizer, wherein the composition is substantially free of a plasticizer comprising a phthalic acid ester, and wherein when the reinforcing filler comprises silica and the composition further comprises a selection from the group consisting of a silica coupling agent, a silica shielding agent, and mixtures thereof; and
   (d) a cure agent,
   wherein the composition is sulfur vulcanizable.

2. The vulcanizable rubber composition of claim 1, wherein the phthalic acid ester plasticizer comprises dioctyl phthalate.

3. The vulcanizable rubber composition of claim 1, wherein the 1,2-cyclohexane-dicarboxylic acid ester is selected from the group consisting of 1,2-diisobutyl-cyclohexanedicarboxylic acid ester; 1,2-di-(2-ethylhexyl) -cyclohexanedicarboxtlic acid ester; 1,2-diisononylcyclohexanedicarboxylic acid ester; 1,2-di-$C_9$-cyclohexane-dicarboxylic acid ester; 1,2-diisopentylcyclohexane-dicarboxylic acid; 1,2-diisoheptyl-cyclohexanedicarboxylic acid; 1,2-diisodecylcyclohexane-dicarboxylic acid; 1,2-di-$C_{7-11}$-cyclohexanedicarboxylic acid; 1,2-di-$C_{9-11}$-cyclohexanedicarboxylic acid; 1,2-di-$C_{7-9}$-cyclohexanedicarboxylic acid; and mixtures thereof.

4. The vulcanizable rubber composition of claim 1, wherein the 1,2-cyclohexane-dicarboxylic acid ester comprises 1,2-diisononylcyclohexanedicarboxylic acid ester.

5. The vulcanizable rubber composition of claim 1, wherein the 1,2-cyclohexane-dicarboxylic acid ester is present in the composition in an amount of about 0.01 to about 100 phr.

6. The vulcanizable rubber composition of claim 1, wherein the elastomer is selected from the group consisting of homopolymers of a conjugated diene monomer, and copolymers and terpolymers of the conjugated diene monomers with monovinyl aromatic monomers and trienes.

7. The vulcanizable rubber composition of claim 5, wherein the amount of the 1,2-cyclohexanedicarboxylic acid ester is about 1 to about 40 phr.

8. The vulcanizable rubber composition of claim 7, wherein the amount of the 1,2-cyclohexanedicarboxylic acid ester is about 5 to about 20 phr.

9. The vulcanizable rubber composition of claim 8, wherein the amount of the 1,2-cyclohexanedicarboxylic acid ester is about 5 to about 15 phr.

10. A pneumatic tire including at least one component comprising a vulcanized rubber compound made from a vulcanizable rubber composition that comprises an elastomer; a reinforcing filler comprising a selection from the group consisting of silica, carbon black, and mixtures thereof; a plasticizer comprising 1,2-cyclohexane-dicarboxylic acid ester, wherein 1,2-cyclohexane-dicarboxylic acid ester is present in the composition in an amount sufficient to substantially replace an equivalent amount by weight of a phthalic acid ester plasticizer, wherein the composition is substantially free of a plasticizer comprising a phthalic acid ester, and wherein when the reinforcing filler comprises silica the composition further comprises a selection from the group consisting of a silica coupling agent, a silica shielding agent, and mixtures thereof; and a cure agent.

11. The pneumatic tire of claim 10, wherein the 1,2-cyclohexanedicarboxylic acid ester comprises 1,2-diisononylcyclohexanedicarboxylic acid.

12. The pneumatic tire of claim 10, wherein the at least one component comprises a tire tread.

* * * * *